(12) United States Patent
Hawwa et al.

(10) Patent No.: US 9,448,092 B1
(45) Date of Patent: Sep. 20, 2016

(54) CLAMP-ON ULTRASONIC FLUID FLOW METER SYSTEM

(71) Applicant: KING FAHD UNIVERSITY OF PETROLEUM AND MINERALS, Dhahran (SA)

(72) Inventors: Muhammad A. Hawwa, Dhahran (SA); Uthman Baroudi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 14/844,954

(22) Filed: Sep. 3, 2015

(51) Int. Cl.
*G01F 1/66* (2006.01)

(52) U.S. Cl.
CPC ........................ *G01F 1/663* (2013.01)

(58) Field of Classification Search
CPC ........................ G01F 1/66; G01F 1/20
USPC .............. 73/861.27–861.29, 861.18
See application file for complete search history.

(56) References Cited

U.S. PATENT DOCUMENTS

| | | | |
|---|---|---|---|
| 3,204,457 A | 9/1965 | Howatt | |
| 4,454,767 A * | 6/1984 | Shinkai | G01F 1/662 73/861.18 |
| 4,787,240 A | 11/1988 | McShane | |
| 5,179,862 A * | 1/1993 | Lynnworth | G01F 1/662 73/861.28 |
| 6,397,683 B1 * | 6/2002 | Hagenmeyer | G01F 15/18 73/861.18 |
| 6,626,049 B1 | 9/2003 | Ao | |
| 6,813,962 B2 | 11/2004 | Gysling et al. | |
| 7,077,012 B2 | 7/2006 | Hirayama et al. | |
| 7,500,402 B2 * | 3/2009 | Pors | A61B 8/4209 73/861.28 |
| 7,963,176 B2 * | 6/2011 | Pors | A61B 8/4209 73/861.25 |
| 7,975,559 B2 | 7/2011 | Gysling | |
| 2012/0266689 A1 | 10/2012 | Schiferli | |
| 2014/0260668 A1 | 9/2014 | Liu et al. | |

* cited by examiner

*Primary Examiner* — Jewel V Thompson
(74) *Attorney, Agent, or Firm* — Richard C. Litman

(57) ABSTRACT

The clamp-on ultrasonic fluid flow meter system is an apparatus that includes structures that filter out a pipe structure-borne ultrasonic wave component. The clamp-on ultrasonic fluid flow meter system provides pipes that are modified to rely on Bragg resonance to attenuate the pipe structure-borne ultrasonic wave component. In a first embodiment, the fluid flow pipe is modified with corrugations so that the periodicity of the corrugations defines a pipe wall corrugation wavelength that is one-half the wavelength of the structure-borne ultrasonic wave component, satisfying Bragg's condition and preventing propagation of structure-borne noise that might interfere with the ultrasonic fluid flow meter. In a second embodiment, a pipe clad material having periodic corrugations as described above is adhesively or magnetically attached to the fluid flow pipe. In a third embodiment, alternating materials at a periodic rate satisfying Bragg's condition are attached to the exterior of the fluid flow pipe.

7 Claims, 5 Drawing Sheets

CLAMP-ON ULTRASONIC FLUID FLOW METER SYSTEM

BACKGROUND OF THE INVENTION

1. Field of the Invention

The present invention relates to fluid flow measuring devices, and particularly to a clamp-on ultrasonic fluid flow meter system with improved accuracy.

2. Description of the Related Art

There is a considerable increase in the trend of using Clamp-On Metering products within building services and process industries. A clamp-on metering system consists of an ultrasonic transmitter and an ultrasonic receiver, which are mounted on the outer wall of the pipe carrying a flow of fluid. The measuring concept is based on transmitting an ultrasonic signal across the moving fluid, then receiving it, modified, after it encounters the fluid flowing in the pipe, and then processing the received signal to derive parameters of interest to calculate fluid flow velocity or volumetric flow rate. In such a metering system, a persistent problem has been how to attenuate a structural borne ultrasonic signal component that appears as noise over the fluid borne ultrasonic signal component used in measuring the fluid flow. This is particularly a problem when the fluid is in the gaseous state, which produces a weak signal when irradiated by ultrasonic waves, so that the weak signal reflection of the incident ultrasonic wave may be lost in or modified by the structural noise propagated in the pipe.

Although many techniques have been tried, none of these techniques have been entirely successful in overcoming structural pipe noise when using a clamp-on ultrasonic fluid flow meter. Thus, a clamp-on ultrasonic fluid flow meter system solving the aforementioned problems is desired.

SUMMARY OF THE INVENTION

The clamp-on ultrasonic fluid flow meter system is an apparatus that includes structures that filter out a pipe structure-borne ultrasonic wave component. The clamp-on ultrasonic fluid flow meter system provides pipes that are modified to rely on Bragg resonance to attenuate the pipe structure-borne ultrasonic wave component. In a first embodiment, the fluid flow pipe is modified with corrugations so that the periodicity of the corrugations defines a pipe wall corrugation wavelength that is one-half the wavelength of the structure-borne ultrasonic wave component, satisfying Bragg's condition and preventing propagation of structure-borne noise that might interfere with the ultrasonic fluid flow meter. In a second embodiment, a pipe clad material having periodic corrugations as described above is adhesively or magnetically attached to the fluid flow pipe. In a third embodiment, alternating materials at a periodic rate satisfying Bragg's condition are attached to the exterior of the fluid flow pipe.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The clamp-on ultrasonic fluid flow meter system is an apparatus that includes structures that rely on Bragg resonance to filter out a pipe structure-borne ultrasonic wave component. The system uses a modified fluid flow pipe having corrugations defined in or attached to the pipe wall, the corrugations coupling incident and reflected ultrasound structure-borne wave components in such a manner that the incident and reflected waves undergo maximum destructive interference at Bragg resonance, thereby preventing the propagation of noise that would otherwise interfere with ultrasound fluid flow meter measurements. Thus, the periodically corrugated pipe wall acts as a stopband filter.

Figure 1:
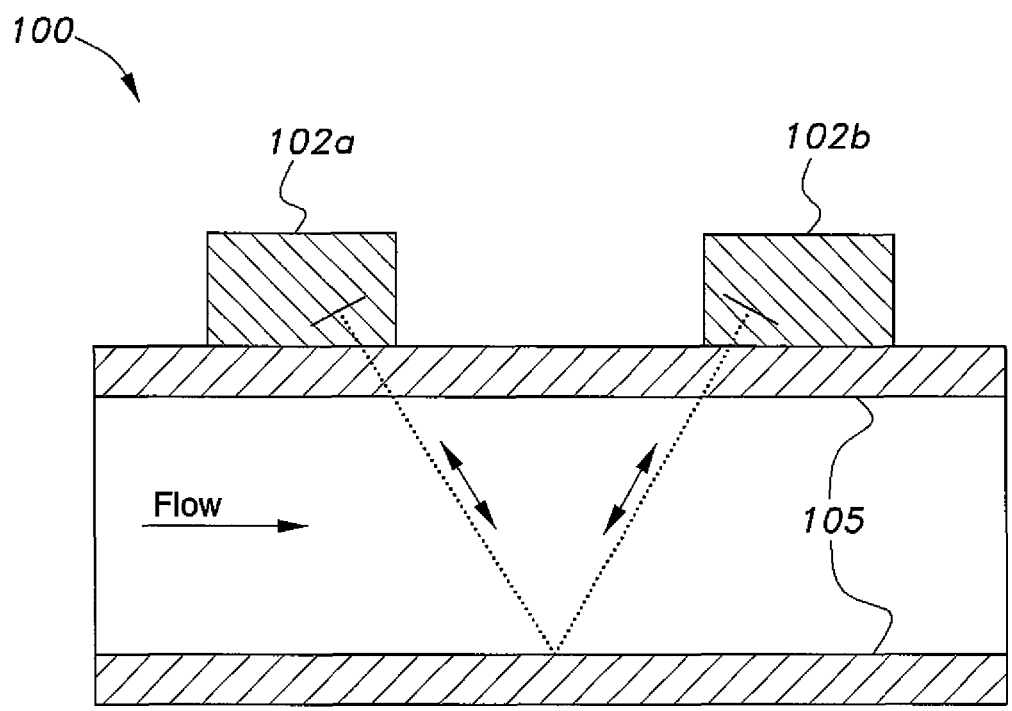
FIG. 1 is a schematic diagram showing a clamp-on ultrasonic fluid flow meter operating under a "time of flight" principle that may be used in a clamp-on ultrasonic fluid flow meter system according to the present invention.

The clamp-on fluid flow meter may be any type of conventional clamp-on ultrasound fluid flow meter. For example, the meter may be an ultrasound meter that operates on the "time of flight" principle, which is suitable for clean liquids. Flow velocity is calculated from the difference in time (normally in nanoseconds, $10^{-9}$ sec) taken for the sound wave to travel either upstream against the flow or downstream with the flow. This is illustrated by exemplary meter 100 (shown in FIG. 1), which includes an ultrasound transmitter 102a and an ultrasound receiver 102b clamped onto a pipe wall 105. The transducers are separated such that transducers 102a and 102b can be used to calculate the aforementioned difference in time between transmission by the transmitter 102a and reception by the receiver 102b, the time of flight being affected by fluid flow through the pipe 105.

Figure 2:
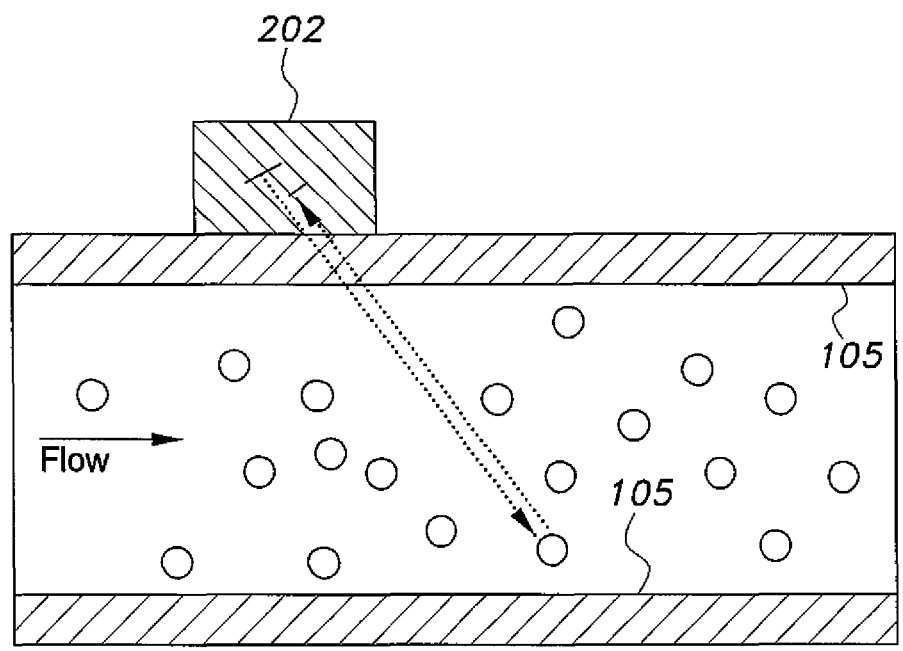
FIG. 2 is a schematic diagram showing a clamp-on ultrasonic fluid flow meter operating under a Doppler principle that may be used in a clamp-on ultrasonic fluid flow meter system according to the present invention.

A second type of ultrasound fluid flow meter that may be used in the present system operates on the Doppler effect, wherein the frequency change between the incident and reflected ultrasound wave permits estimation of fluid flow through the pipe, a method that is suitable for contaminated or bubbly liquids: When ultrasound wave hits a moving particle or gas bubble, the reflected sound wave can be detected and the frequency shift measured. The frequency change is proportional to flow velocity. This is illustrated by exemplary meter 200 (shown in FIG. 2) where it is seen that a single transducer 202 is disposed on the outer surface of the pipe wall 105. The frequency at which the transmitter-receiver system operates is determined by natural frequencies of the drive electronics and the transducers. Both "time of flight" and Doppler effect clamp-on ultrasound fluid flow meters are well known in the art, and need not be described further.

Figure 3:
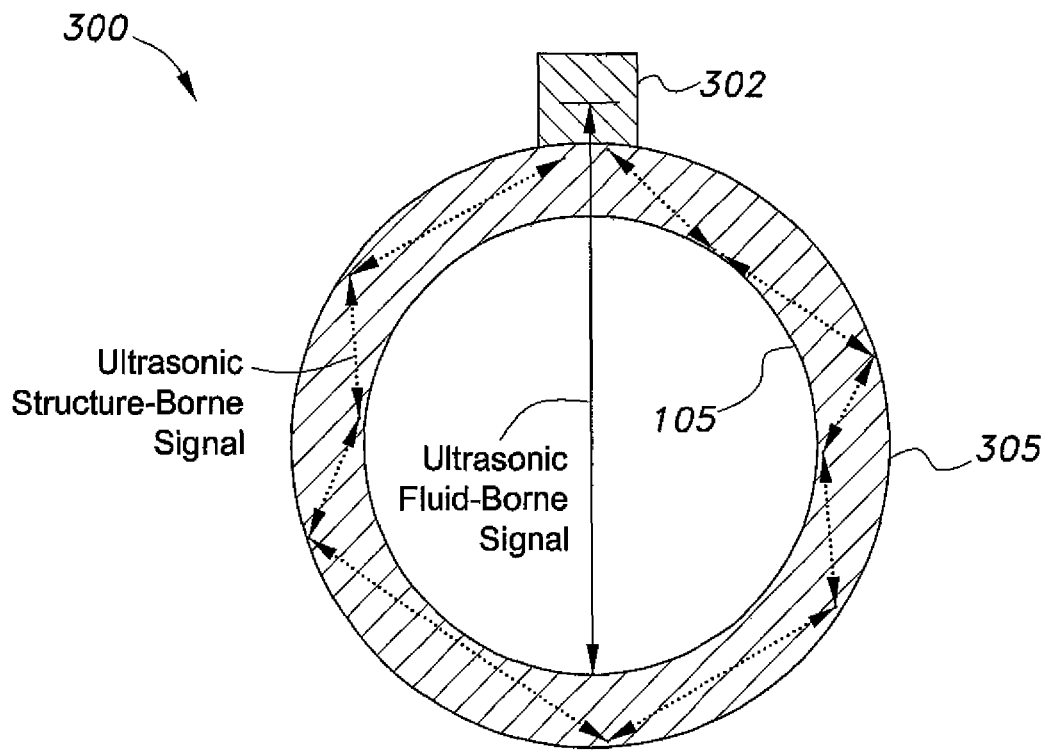
FIG. 3 is a schematic diagram showing a clamp-on ultrasonic fluid flow meter of the prior art that has both an ultrasonic fluid-borne signal component and an ultrasonic structure-borne signal component.

Regardless of which type of clamp-on ultrasound fluid flow meter is used for measuring the fluid flow, the transmitted signal is split into two components. As illustrated by exemplary prior art system 300 (shown in FIG. 3), the two ultrasonic components resulting from operation of ultrasound transducer 302 are (i) a fluid-borne ultrasonic signal component, which is useful for estimating the fluid flow characteristics; and (ii) a structure-borne ultrasonic signal component propagating in the pipe wall 105 that appears as noise over the fluid borne ultrasonic signal component. The smooth outer surface 305 of the conventional pipe wall 105 does nothing to abate propagation of the structure-borne ultrasonic signal component.

Figure 4:
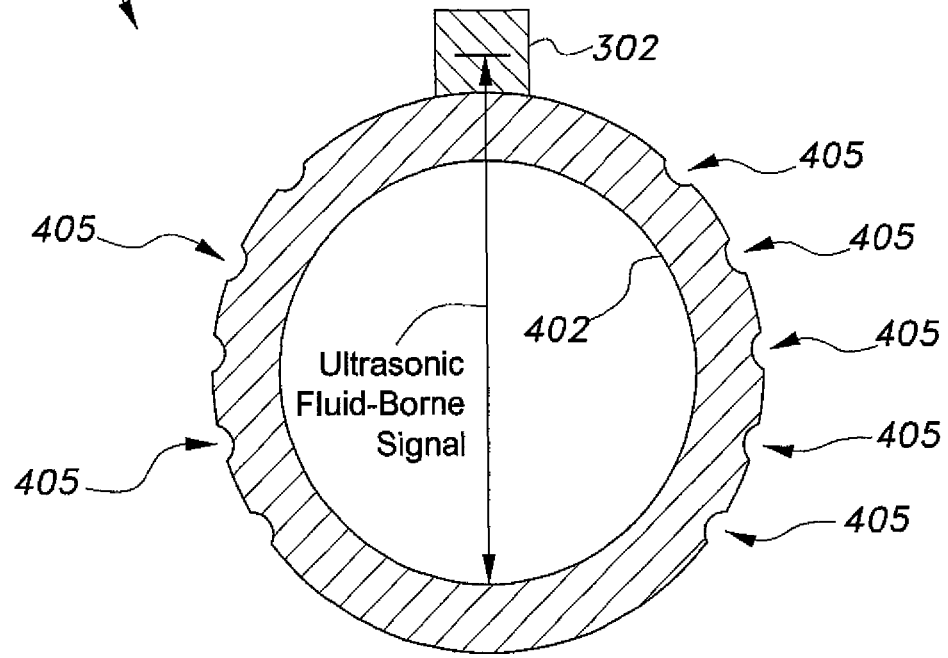
FIG. 4 is a section view of a first embodiment of a clamp-on ultrasonic fluid flow meter system according to the present invention.
Figure 5:
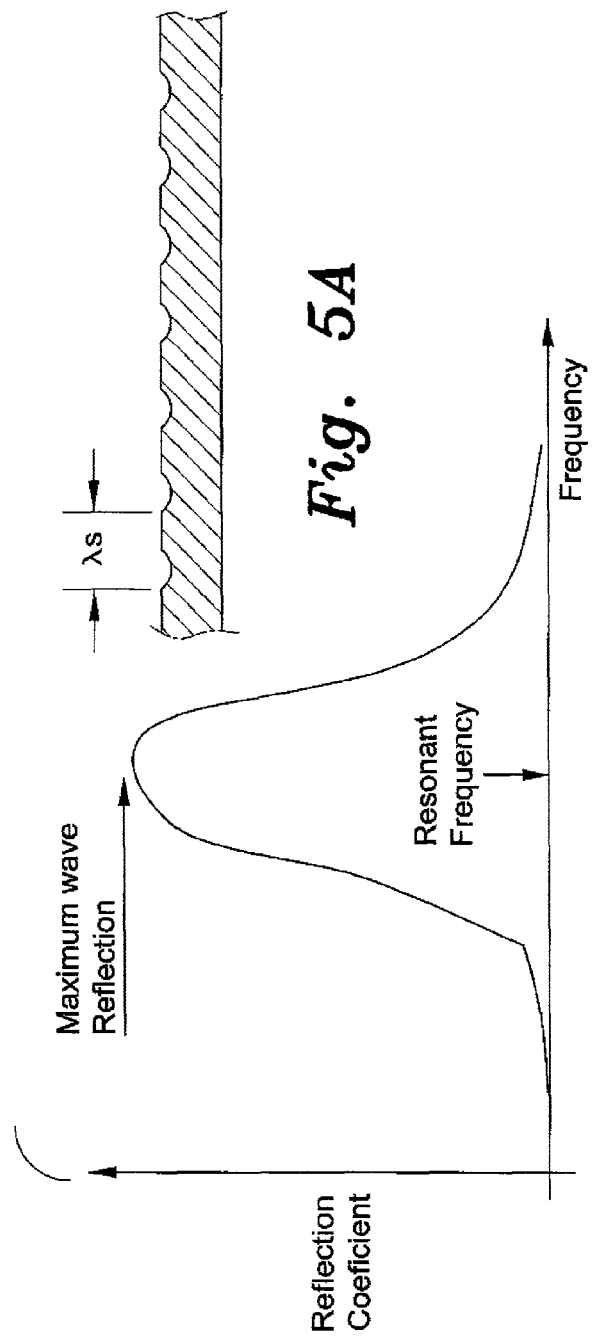
FIG. 5A is a partial section view of a corrugated pipe wall in a clamp-on ultrasonic fluid flow meter system according to the present invention, illustrating the periodic nature of the corrugations.
FIG. 5B is a plot of reflection coefficient as a function of frequency for corrugated pipe wall section of FIG. 5A, illustrating Bragg reflection.

FIG. 4 shows a first embodiment of the clamp-on ultrasonic fluid flow meter system 400, which takes advantage of Bragg resonance to eliminate noise arising from the structure-borne ultrasonic signal component. In the present system, the outer surface of the pipe wall 402 has corrugations 405 defined therein at regular periodic intervals. The Bragg condition corresponds to the following wavenumber relationship: $\lambda_s = 2\lambda_w$, where $\lambda_w$ is the wavelength of the pipe wall corrugation period and $\lambda_s$ is the wavelength of the structure-borne ultrasonic wave. Assuming small-amplitude periodic wall corrugation, the interactions of ultrasonic modes with the corrugated wall 402 under the occurrence of Bragg resonance is described by coupled differential equations of the form:

$$\frac{dA}{dx} = \Phi B(x), \quad (1)$$

and $$\frac{dB}{dx} = \Psi A(x), \quad (2)$$

where A and B are the amplitudes of the incident and reflected structure-borne ultrasonic wave modes, $\Phi$ and $\Psi$ are wave coupling coefficients, and x is a length of a path traversed by the ultrasonic wave within a wall of the pipe. The design of periodic corrugations 405 (repeating corrugations spaced at predefined intervals on the outer surface of the pipe 402) utilize the Bragg resonance coupled differential equations (1) and (2) to provide attenuation of the structure-borne ultrasonic wave modes $\Phi$ and $\Psi$ due to signal transmission from transducer 302. The typical reflection coefficient-frequency response is shown in FIG. 5B, where maximum ultrasonic wave reflection takes place at the resonant frequency. Hence, as shown in resonance/pipe section of FIG. 5A, the wall corrugation is tuned to the propagation structure-borne wavelength $\lambda_s$ for ensuring significant blocking of structure-borne wave propagation.

Figure 6:
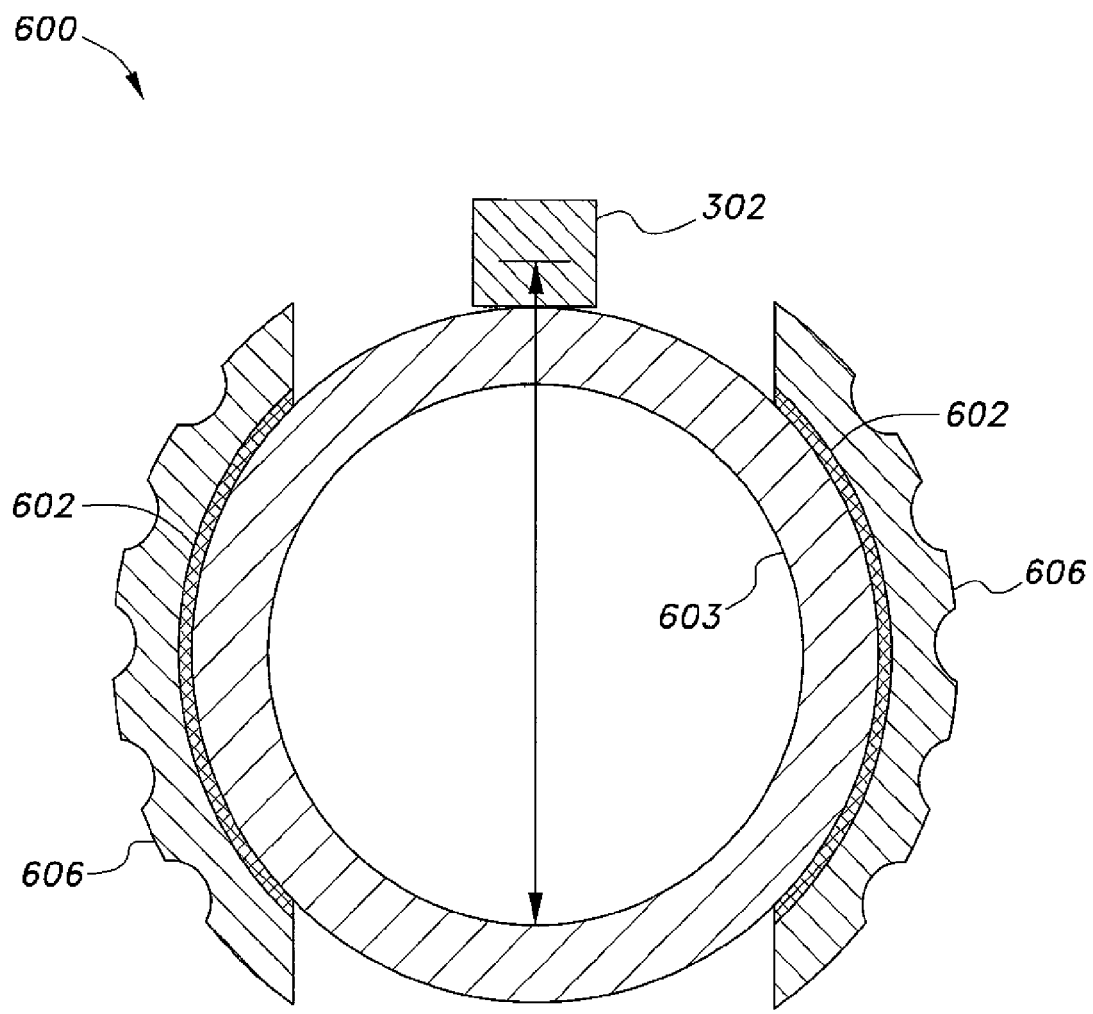
FIG. 6 is a section view of a second embodiment of a clamp-on ultrasonic fluid flow meter system according to the present invention.
Figure 7A:
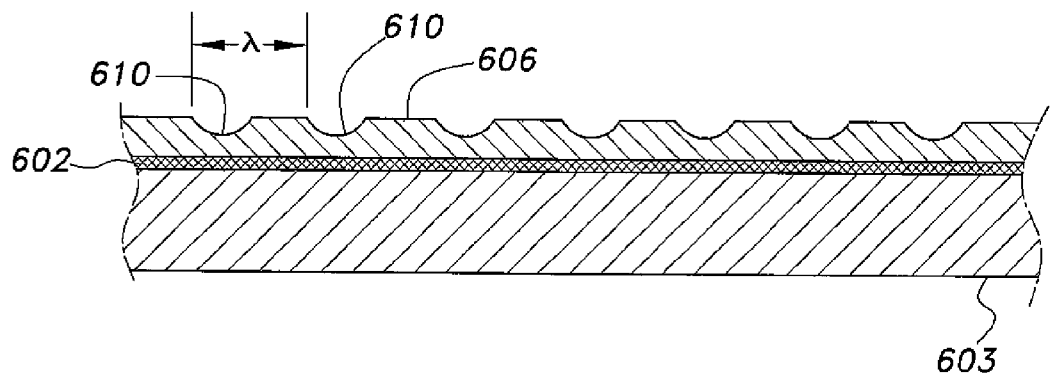
FIG. 7A is a partial section view of the fluid flow pipe in the system of FIG. 6.

Making engraved wall corrugations is not always a possible solution for the control of structure-borne ultrasonic wave propagation. There are, however, other ways to impose periodic patterns on the pipe wall. For example, as shown in the clamp-on ultrasonic fluid flow meter system 600 of FIG. 6, a sleeve or clad 606 having an add-on periodic pattern can be mounted on the outer surface of the pipe wall 603. In this case, the periodic clad 606 is attached to the outer surface of the pipe wall 603 via a thin layered material 602. The thin layered material 602 may be an adhesive, or a thin magnetic layer in case the pipe wall is ferrous material. The corrugated clad 606 functions as a periodic pattern that causes destructive wave interaction under the Bragg resonance condition. A portion of the pipe wall 603a is shown in FIG. 7A and illustrates that the distance between corrugations 610 of the periodic clad 606 is the Bragg wavelength, $\lambda$.

Figure 7B:
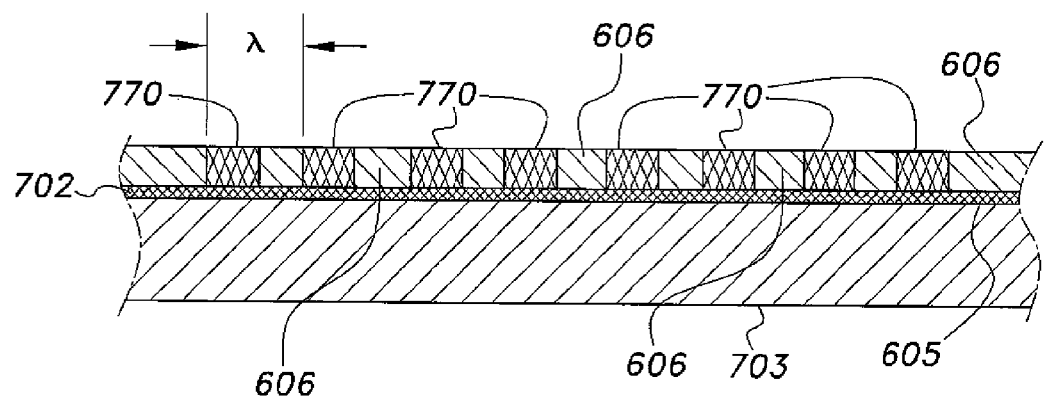
FIG. 7B is a partial section view of the fluid flow pipe in a third embodiment of a clamp-on ultrasonic fluid flow meter system according to the present invention.

In yet another embodiment of the clamp-on ultrasonic fluid flow meter system, shown in FIG. 7B, the add-on periodic pattern is formed from a clad 606 attached to the pipe wall 703 by adhesive 605 or a magnetic layer. The use of alternating materials disposed at intervals within the clad 606 is shown. The clad 606 is primarily one material type. A second material type 770 is embedded in the clad 606 at intervals to create alternating sections of primary and secondary constituents within the clad 606, the length of each primary-secondary pair being the Bragg wavelength, $\lambda$. In each system, the destructive interference that occurs at Bragg resonance abates propagation of noise resulting from the structure-borne ultrasonic signal component that would otherwise interfere with measurements made by the clamp-on ultrasonic fluid flow meter, particularly when the fluid-borne ultrasound signal component is weak, e.g., when the fluid is or contains gas.

It is to be understood that the present invention is not limited to the embodiments described above, but encompasses any and all embodiments within the scope of the following claims.

We claim:

1. A clamp-on ultrasonic fluid flow meter system, comprising:
    a section of fluid flow pipe defined by a pipe wall having an outer surface and having repeating corrugations spaced at periodic intervals on the outer surface of the pipe wall, the periodic intervals of the corrugations being spaced according to a set of equations defined by:

$$\frac{dA}{dx} = \Phi B(x),$$

and $$\frac{dB}{dx} = \Psi A(x),$$

where A and B are amplitudes of incident and reflected structure-borne ultrasonic wave signal components, respectively, $\Phi$ and $\Psi$ are wave coupling coefficients, and x is a length of a path traversed by the ultrasonic wave within the pipe wall; and
    a clamp-on ultrasonic fluid flow meter having at least one transducer clamped on the pipe for measuring fluid flow within the section of fluid flow pipe.

2. The clamp-on ultrasonic fluid flow meter system according to claim 1, wherein the periodic intervals are defined by a propagation structure-borne wavelength $\lambda_s = 2\lambda_w$, where $\lambda_w$ is a wavelength of a structure-borne ultrasonic wave component of ultrasonic wave propagation in the pipe wall.

3. The clamp-on ultrasonic fluid flow meter system according to claim 1, wherein the corrugations are formed directly in the pipe wall.

4. The clamp-on ultrasonic fluid flow meter system according to claim 1, wherein the system further comprises a clad material attached to the outer surface of the pipe wall, the corrugations being formed in the clad material.

5. The clamp-on ultrasonic fluid flow meter system according to claim 4, wherein the system further comprises a spacer material having a different composition from the clad material and the section of fluid flow pipe, the spacer material being disposed in the corrugations to form alternating pairs of spacer material and clad material, each of the pairs having a length of $\lambda_s = 2\lambda_w$, where $\lambda_s$ is a propagation structure-borne wavelength of the section of fluid flow pipe and $\lambda_w$ is a wavelength of a structure-borne ultrasonic wave component of ultrasonic wave propagation in the pipe wall.

6. The clamp-on ultrasonic fluid flow meter system according to claim 1, wherein said at least one transducer comprises an ultrasonic transmitter and an ultrasonic receiver, the transmitter and the receiver being clamped onto the section of fluid flow pipe at a spaced interval, said ultrasonic fluid flow meter having means for measuring fluid flow in the section of fluid flow pipe by time of flight of an ultrasonic wave transmitted by the transmitter and received by the receiver.

7. The clamp-on ultrasonic fluid flow meter system according to claim 1, wherein said at least one transducer comprises a single transducer having an ultrasonic transmitter and an ultrasonic receiver, said ultrasonic fluid flow meter having means for measuring fluid flow in the section of fluid flow pipe Doppler effect.

* * * * *